US012444825B2

(12) United States Patent
Xiao et al.

(10) Patent No.: US 12,444,825 B2
(45) Date of Patent: Oct. 14, 2025

(54) DIELECTRIC FILTER, AND AU, RU OR BS HAVING THE SAME

(71) Applicant: Telefonaktiebolaget LM Ericsson (publ), Stockholm (SE)

(72) Inventors: Yuhua Xiao, Beijing (CN); Juandi Song, Beijing (CN); Ying Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 319 days.

(21) Appl. No.: 18/022,229

(22) PCT Filed: Aug. 13, 2021

(86) PCT No.: PCT/CN2021/112559
§ 371 (c)(1),
(2) Date: Feb. 20, 2023

(87) PCT Pub. No.: WO2022/042339
PCT Pub. Date: Mar. 3, 2022

(65) Prior Publication Data
US 2023/0327313 A1 Oct. 12, 2023

(30) Foreign Application Priority Data
Aug. 27, 2020 (WO) ................ PCT/CN2020/111853

(51) Int. Cl.
*H01P 1/213* (2006.01)
*H01P 1/20* (2006.01)
*H01P 7/10* (2006.01)

(52) U.S. Cl.
CPC ............ *H01P 7/105* (2013.01); *H01P 1/2002* (2013.01); *H01P 1/213* (2013.01); *H01P 1/2138* (2013.01)

(58) Field of Classification Search
CPC ...... H01P 1/2002; H01P 1/213; H01P 1/2138; H01P 1/20; H01P 1/201; H01P 1/207;
(Continued)

(56) References Cited

U.S. PATENT DOCUMENTS 9,466,864 B2 * 10/2016 Rogozine .............. H04L 5/1461
2018/0131063 A1 5/2018 Zhu et al.

FOREIGN PATENT DOCUMENTS

CN 108649302 A 10/2018
CN 110112518 A 8/2019
(Continued)

OTHER PUBLICATIONS

International Search Report and the Written Opinion of the International Searching Authority, issued in corresponding International Application No. PCT/CN2021/112559, dated Dec. 2, 2021, 12 pages.
(Continued)

*Primary Examiner* — Stephen E. Jones
(74) *Attorney, Agent, or Firm* — Rothwell, Figg, Ernst & Manbeck, P.C.

(57) ABSTRACT

A dielectric filter with a first radio frequency (RF) passband and a second RF passband, a radio unit, an antenna unit and a base station are disclosed. According to an embodiment, the dielectric filter (1) comprises a body (2) with a plurality of resonators (201, 202, 203, 204, 205) including a first resonator (202), a second resonator (204) and a common resonator (203). The common resonator (203) is coupled under its first resonance mode to the first resonator (202) to provide the first RF passband, and is coupled under its second resonance mode to the second resonator (204) to provide the second RF passband.

10 Claims, 4 Drawing Sheets

(58) Field of Classification Search
CPC ........ H01P 1/208; H01P 1/2088; H01P 7/105; H01P 3/16
See application file for complete search history.

(56) References Cited

FOREIGN PATENT DOCUMENTS

| | | | |
|---|---|---|---|
| CN | 111146539 | A | 5/2020 |
| CN | 111370825 | A | 7/2020 |
| CN | 111403865 | A | 7/2020 |
| CN | 111509338 | A | 8/2020 |

OTHER PUBLICATIONS

International Preliminary Report on Patentability issued in issued in corresponding International Application No. PCT/CN2021/112559, dated Nov. 3, 2022, 6 pages.

* cited by examiner

DIELECTRIC FILTER, AND AU, RU OR BS HAVING THE SAME

CROSS REFERENCE TO RELATED APPLICATION(S)

This application is a 35 U.S.C. § 371 National Phase Entry Application from PCT/CN2021/112559, filed Aug. 13, 2021, designating the United States, and also claims the benefit of International Application No. PCT/CN2020/111853, filed Aug. 27, 2020, the disclosures of which are incorporated herein by reference in their entirety.

TECHNICAL FIELD

The present disclosure generally relates to components of communication device, and more particularly, to a dielectric filter, an antenna unit (AU) or a radio unit (RU) having the dielectric filter, and a base station (BS) having the AU and/or the RU.

BACKGROUND

This section introduces aspects that may facilitate better understanding of the present disclosure. Accordingly, the statements of this section are to be read in this light and are not to be understood as admissions about what is in the prior art or what is not in the prior art.

BS is an important part of a mobile communication system, and may include an RU and an AU. Considering the installation/fixation/occupation, smaller volume and lighter weight is always an important evolution direction in BS design, including legacy base station, street macro, micro, small cell and advanced antenna system (AAS).

With the development of 5th Generation (5G) communication, Multiple-Input and Multiple-Output (MIMO) technology is widely used in Sub-6 GHz BS product, in which a large number of filters need to be integrated/embedded with AU or RU. Considering cost and space saving, filters are usually soldered onto radio mother board (MOB), low pass filter (LPF) board, antenna calibration (AC) board or power splitter board, to reduce size and weight of the product.

In traditional BS solution, metal cavity filter is most recommended because of its high quality factor (Q) value and power handling performance. For 5G advanced radio system, power handling requirement becomes less critical, while the size and weight of filters becomes hot issues. Ceramic waveguide (CWG) filter is one of most preferred 5G filter solutions, due to its competitive Q value, light weight, small size, low cost and easy to combine with other parts.

In time divisional duplex (TDD) systems and frequency division duplex (FDD) systems, it is important to further reduce radio size, weight and cost by integrating two different passbands or multiple passbands to one unit. CWG duplexer or multiplexer is a good solution for this, and has more benefits especially for the better design flexibility.

CWG duplexer and multiplexer also can be used in some traditional macro BS instead of metal cavity multiplexer. It has great advantages in respect of weight and size compared with metal cavity multiplexer. It has better insertion loss and power handing capacity than other kinds of filter. There is no doubt that CWG duplexer and multiplexer will be a new popular solution in BS system, it will be more and more widely used with the better development of ceramic manufacturing technology. To find a proper way to design and produce CWG filters with different bands or different channels is a key factor about CWG duplexer and multiplexer.

Existing CWG duplexer normally uses a ceramic T-junction to divide one signal to different paths. This kind of T-junction will increase the size and weight of the ceramic part and will also increase design difficulty.

Another kind of CWG duplexer uses a T-junction on printed circuit board (PCB), which may be a microstrip line or a strip line depending on design requirement. It has benefit for CWG reliability and is easy to combine with MOB, LPF board, AC board or power splitter board. But this kind of duplexer is hard to tuning, and lines on PCB will bring extra loss and also increase the size.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for a multi-band dielectric filter used in AU, RU or BS, which can reduce the size, weight, volume of the products and get better design flexibility, and can be easily produced.

According to a first aspect of the disclosure, there is provided a dielectric filter with a first radio frequency (RF) passband and a second RF passband. The dielectric filter comprises a body with a plurality of resonators including a first resonator, a second resonator and a common resonator. The common resonator is coupled under its first resonance mode to the first resonator to provide the first RF passband, and is coupled under its second resonance mode to the second resonator to provide the second RF passband.

In an embodiment of the disclosure, the common resonator has two blind holes formed at two opposite surfaces of the body to provide at least two resonance modes.

In an embodiment of the disclosure, the common resonator has a T-shaped groove or an L-shaped groove to provide at least two resonance modes.

In an embodiment of the disclosure, the common resonator is provided at an input port or an output port.

In an embodiment of the disclosure, a first common resonator is provided at an input port, and a second common resonator is provided at an output port.

In an embodiment of the disclosure, a capacitive crossing coupling is formed between the common resonator and a third resonator, and an inductive cross coupling is formed between the common resonator and a fourth resonator.

In an embodiment of the disclosure, the common resonator is further coupled under its third resonance mode to a third resonator to provide a third RF passband.

In an embodiment of the disclosure, the dielectric filter is a CWG filter.

According to a second aspect of the disclosure, there is provided an AU. The AU comprises at least one dielectric filter according to the first aspect. The dielectric filter is attached to, especially soldered onto, an AC board or a power splitter board.

According to a third aspect of the disclosure, there is provided an RU. The RU comprises at least one dielectric filter according to the first aspect. The dielectric filter is attached to, especially soldered onto, a radio MOB or an LPF board.

According to a fourth aspect of the disclosure, there is provided a BS. The BS comprises an AU according to the second aspect and/or an RU according to the third aspect.

In an embodiment of the disclosure, the BS is a multi-band TDD or FDD system.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
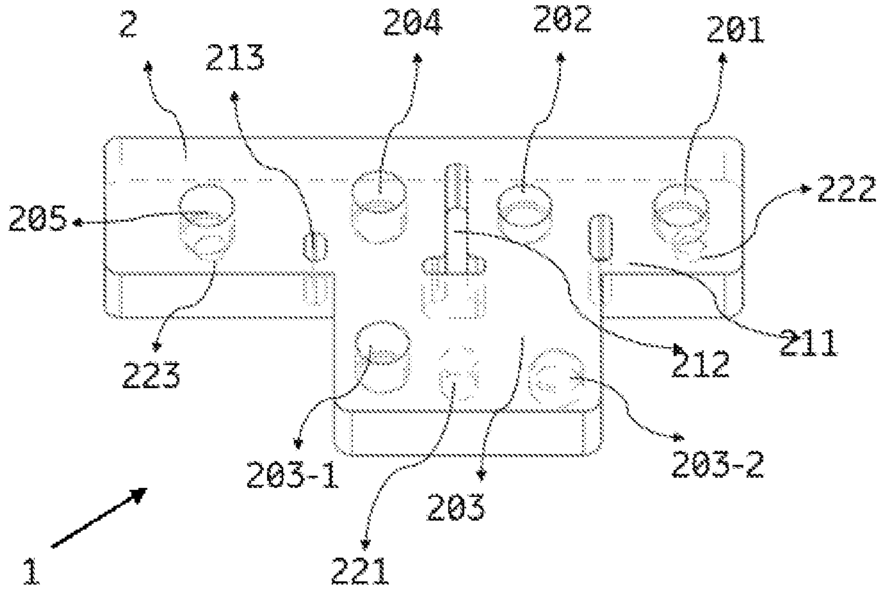
FIG. 1 is a perspective view illustrating a dual-band CWG filter according to an embodiment of the disclosure.

FIG. 1 shows a perspective view of a dual-band CWG filter according to an embodiment of the disclosure. As shown in FIG. 1, the dual-band CWG filter 1 according to this embodiment comprises a body 2 made of ceramic. The entire exterior surface or substantially the entire exterior surface of the body 2 is metallized or is provided with an electrically conductive material, layer(s) and/or coating(s) thereon. For example, all the surfaces of the body 2 are covered with a conducting layer which may be formed by, for example, electroplating metal on the surfaces of the body 2. The metal may be silver, or may be another metal that satisfies a specific requirement.

The body 2 comprises five cavities or resonators 201, 202, 203, 204, 205, each having at least one respective blind hole. Although the blind holes are shown to have a circular cross section, the present disclosure is not limited to this. For example, any of the blind holes may be in a shape of a rectangle, an ellipse, or any other shapes in the cross section. Each of the blind holes is provided with a conducting layer which, for example, is formed by electroplating metal on the bottom surface and the wall surface of the blind hole. The resonance frequency of each resonator may be tuned, for example, by removing a part of the conducting layer that covers the bottom surface and/or the wall surface of the respective blind hole.

In this embodiment, each of the resonators 201, 202, 204, 205 has just one blind hole disposed on the top surface of the body 2, or in other words, opening at the top surface of the body 2 and extending toward the bottom surface of the body 2. In another embodiment, some of the blind holes may open at the bottom surface and extend toward the top surface of the first filter 2. The resonator 203 has two blind holes 203-1 and 203-2, one opening at the top surface of the body 2 and the other opening at the bottom surface of the body 2, such that the resonator may function as a dual-mode resonator. All the blind holes of the resonators 201-205 may have same or different depth, i.e. dimension in the extending direction of the blind hole. The depth of each blind hole can be set as needed to obtain a desired resonance frequency.

Further, the body 2 has three groove means 211, 212, 213 that penetrates through the body 2. The groove means 211-213 serve as isolation walls between two adjacent resonators, which help to tune the coupling value between the two adjacent resonators. In the illustrated embodiment, the groove means 211 has a bar-shape in the cross section of the body 2 and isolates the resonators 201 and 202, the groove means 213 has a bar-shape in the cross section of the body 2 and isolates the resonators 204 and 205, and the groove means 212 has a T-shape in the cross section of the body 2 and isolates the resonators 202, 203 and 204. However, the present disclosure is not limited to this, and each of the groove means 211-213 may take any appropriate shape in the cross section.

In this embodiment, the resonator 203 as a common resonator is coupled under its first resonance mode to the resonator 202 to provide a first RF passband, i.e., Band 1, and is coupled under its second resonance mode to the resonator 204 to provide a second RF passband, i.e., Band 2. The resonator 202 is an example of "a first resonator" in the claims, and the resonator 204 is an example of "a second resonator" in the claims. The resonator 201 is also coupled to the first RF passband, and the resonator 205 is also coupled to a second RF passband. The resonator 203 has an input port 221 for both Band 1 and Band 2, the resonator 201 has an output port 222 for Band 1, and the resonator 205 has an output port 223 for Band 2.

Figure 2:
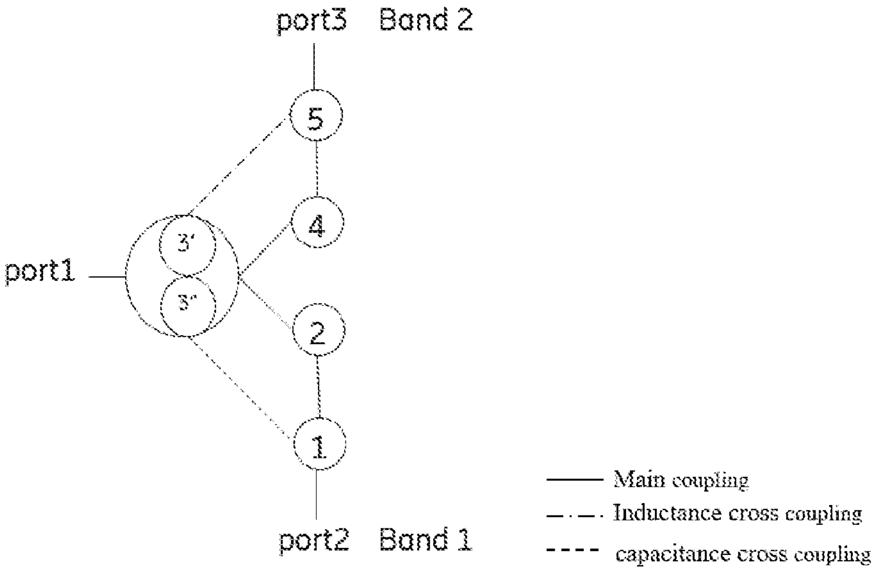
FIG. 2 is a schematic diagram illustrating a topology of the dual-band CWG filter.

FIG. 2 shows a schematic diagram of a topology of the CWG filter 1. In FIG. 2, sequence numbers 1-5 in a circle correspond to the five resonators 201-205, respectively, and port1, port2, port3 correspond to the input port 221, the output port 222 and the output 223, respectively. It will be readily appreciated by those skilled in the art that port1 may be used as an output port while port2 and port3 may be used as input ports.

As shown in FIG. 2, The dual-band CWG filter 1 has three resonators in each of the two different channels or passbands. The two passbands have one common cavity No. 3, i.e., the resonator 203. In the first channel comprising the resonators 201, 202 and 203, a 3-pole topology with one transmission zero is provided, wherein two mainline couplings (1-2 and 2-3) and one capacitive/negative cross-coupling (1-3) are provided. In the second channel comprising the resonators 203, 204 and 205, a 3-pole topology with one transmission zero is provided, wherein two mainline couplings (3-4 and 4-5) and one inductive/positive cross-coupling (3-5) are provided. The mainline couplings may be provided by a respective electrically conductive structure in the body 2, the type of which may be an aperture and/or a hole.

Figure 3:
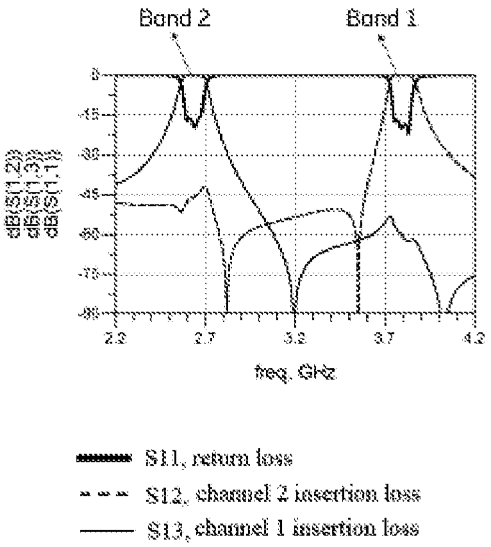
FIG. 3 is a schematic diagram illustrating a frequency response curve of the dual-band CWG filter.

FIG. 3 shows a schematic diagram of a frequency response curve of the dual-band CWG filter 1. As shown in FIG. 3, the first channel has a passband indicated by Band 1, and a transmission zero is produced on the lower side of the Band 1 by the capacitive/negative cross-coupling (1-3). The second channel has a passband indicated by Band 2, and a transmission zero is produced on the higher side of the Band 2 by the inductive/positive cross-coupling (3-5). The frequency point position of each transmission zero can be tuned by adjusting the corresponding cross-coupling value.

Figure 4A:
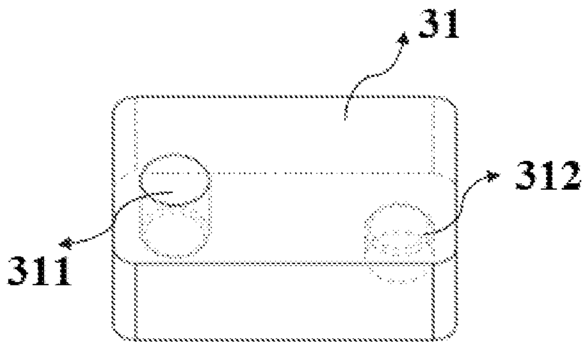
FIG. 4A, FIG. 4B and FIG. 4C illustrate examples of a dual-mode common resonator of the dual-band CWG filter.

FIG. 4A shows an example of a dual-mode resonator. The dual-mode resonator 31 has two frequency holes 311 and 312. The frequency hole 311 at the top side corresponds to the blind hole 203-1 of the resonator 203 in FIG. 1, and the frequency hole 312 at the bottom side corresponds to the blind hole 203-2 of the resonator 203 in FIG. 1. The height and direction of the frequency holes 311 and 312 can be changed according to design requirement. A first resonance mode corresponding to or coupled to Band 1 is achieved and controlled by both the two frequency holes, and a second resonance mode corresponding to or coupled to Band 2 is achieved and controlled by one of the two frequency holes. As mentioned above, the frequency holes may be in any appropriate shape in the cross section, such as a circle, a rectangle, an ellipse, etc. In addition, the two frequency holes can have same or different dimension along the hole, and either one of or both the two frequency holes can be through hole(s).

Figure 4B:
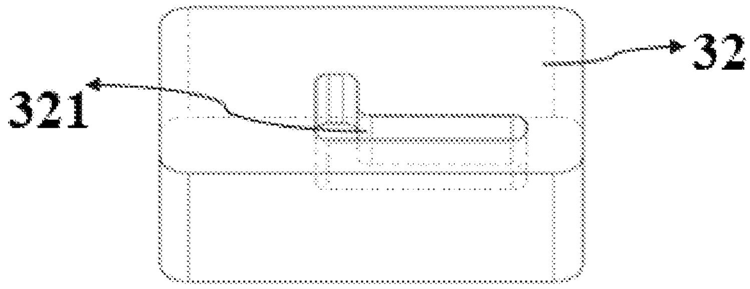
Figure 4C:
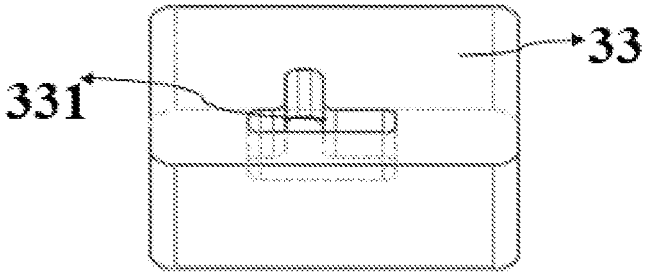

FIG. 4B shows another example of a dual-mode resonator 32, which has an L-shaped groove 321. FIG. 4C shows another example of a dual-mode resonator 33. which has a T-shaped groove 331. Both the L-shaped groove 321 and the T-shaped groove 331 can produce two resonance modes. The resonant groove is not limited to L type and T type, and it can also be in other kinds of shape which can produce two resonance modes.

It will be easily appreciated that each of the resonators shown in FIG. 4A, FIG. 4B and FIG. 4C is only a part (i.e., the common resonator 203) of the CWG filter 1 shown in FIG. 1, rather than an independent member.

In the above embodiment shown in FIG. 1 and FIG. 2, the dual-mode common resonator 203 is provided at port 1 which may be an input port or an output port for both Band 1 and Band 2. Thus, the dual-band CWG filter 1 is configured as a three-port device. The connection at the input port or the output port may be a soldering pad, a pin connection, an RF connector, a direct coupling, or any other possible methods.

Figure 5:
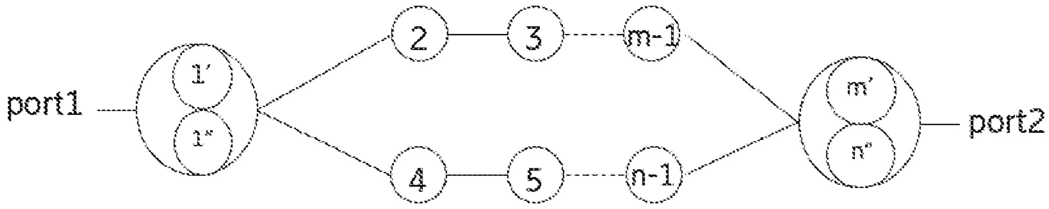
FIG. 5 is a schematic diagram illustrating a topology of a dual-band CWG filter according to another embodiment of the disclosure.

FIG. 5 shows a schematic diagram of a topology of a dual-band CWG filter according to another embodiment of the disclosure. In this embodiment, two dual-mode common resonators are provided, one at the input port (i.e., port1) and the other at the output port (i.e., port2). Thus, the dual-band CWG filter is configured as a two-port device, and the number of connections such as RF connectors can be further reduced.

It can also be seen from FIG. 5 that the number of poles in either the first channel or the second channel can be increased. Accordingly, the number of transmission zeros for Band 1 or Band 2 can also be increased.

In the above-mentioned embodiments, the CWG filter having at least one dual-mode common resonator is configured as a dual-band filter. However, the present disclosure is not limited to this. In another embodiment, the common resonator may be coupled under its three different resonance modes to three adjacent resonators, and thus a tri-band filter is formed.

The CWG filter as discussed above can be attached to a PCB board. For example, at least one CWG filter may be soldered onto an AC board or a power splitter board of an AU, and thus is integrated with the AU. In addition, at least one CWG filter may be soldered onto a radio MOB or an LPF board of an RU, and thus is integrated with the RU.

The present disclosure also relates to a BS comprising the above-mentioned AU and/or RU, especially a multi-band TDD system or FDD system.

While the embodiments of the present application has been described with reference to CWG filter, it should be noted the the present application is not limited to CWG filter, and can be applied to any kind of dielectric filter.

Advantages of embodiments of the disclosure will be described below.

According to embodiments of the present disclosure, the dual-band CWG filter uses a dual-mode common resonator to combine two different bands to one unit, one mode of the common resonator coupled to the first passband and the other mode coupled to the second passband. Compared with existing dual-band CWG filters in which a ceramic T-junction or a PCB T-junction is used, the size, weight, volume of the filter unit and thus of the whole device will be reduced. Also, insertion loss and power handing capacity can be improved.

Further, because only one block of ceramic is needed to get two different passbands, the production time can be shortened and the production efficiency can be improved.

In a case where two dual-mode common resonators are used at both input port and output port, the dual-band filter will only have two ports, which will reduce the number of RF connecters. The cost can be further reduced.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A dielectric filter with a first radio frequency (RF) passband and a second RF passband, comprising a body with a plurality of resonators including a first resonator, a second resonator and a common resonator, wherein the common resonator is coupled under its first resonance mode to the first resonator to provide the first RF passband, and is coupled under its second resonance mode to the second resonator to provide the second RF passband.

2. The dielectric filter according to claim 1, wherein the common resonator has two blind holes formed at two opposite surfaces of the body to provide at least two resonance modes.

3. The dielectric filter according to claim 1, wherein the common resonator has a T-shaped groove or an L-shaped groove to provide at least two resonance modes.

4. The dielectric filter according to claim 1, wherein the common resonator is provided at an input port or an output port, and a second common resonator is provided at the other of the input port and output port.

5. The dielectric filter according to claim 1, wherein a capacitive crossing coupling is formed between the common resonator and a third resonator, and an inductive cross coupling is formed between the common resonator and a fourth resonator.

6. The dielectric filter according to claim 1, wherein the common resonator is further coupled under its third resonance mode to a third resonator to provide a third RF passband.

7. The dielectric filter according to claim 1, wherein the dielectric filter is a ceramic waveguide (CWG) filter.

8. An antenna unit (AU), comprising at least one dielectric filter according to claim 1, wherein the dielectric filter is attached to an antenna calibration board or a power splitter board.

9. The dielectric filter according to claim 1, wherein the common resonator is provided at an input port or an output port.

10. A radio unit (RU), comprising at least one dielectric filter according to claim 9, wherein the dielectric filter is attached to a radio mother board or a low pass filter board.

* * * * *